United States Patent [19]

Shelton

[11] Patent Number: 4,573,435

[45] Date of Patent: Mar. 4, 1986

[54] APPARATUS AND METHOD FOR GENERATING HYDROGEN GAS FOR USE AS A FUEL ADDITIVE IN DIESEL ENGINES

[76] Inventor: Glenn F. Shelton, Rte. 1, Box 333, Lawsonville, N.C. 27022

[21] Appl. No.: 749,733

[22] Filed: Jun. 28, 1985

Related U.S. Application Data

[63] Continuation-in-part of Ser. No. 710,718, Mar. 12, 1985.

[51] Int. Cl.$^4$ .............................................. F02B 43/10
[52] U.S. Cl. .................. 123/3; 123/DIG. 12; 123/1 A; 123/25 P
[58] Field of Search .................. 123/DIG. 12, 1 A, 3, 123/25 B, 25 C, 25 D, 25 P

[56] References Cited

U.S. PATENT DOCUMENTS

| | | | |
|---|---|---|---|
| 4,003,343 | 1/1977 | Lee | 123/DIG. 12 |
| 4,009,006 | 2/1977 | Hreha | 123/3 |
| 4,030,453 | 6/1977 | Sugimoto | 123/25 P |
| 4,036,181 | 7/1977 | Matovich | 123/3 |
| 4,037,568 | 7/1977 | Schreiber | 123/3 |
| 4,114,566 | 9/1978 | Harpman et al. | 123/3 |
| 4,178,882 | 12/1979 | Anderson et al. | 123/DIG. 12 |
| 4,256,060 | 3/1981 | Kelly | 123/DIG. 12 |
| 4,380,970 | 4/1983 | Davis | 123/DIG. 12 |

Primary Examiner—Ira S. Lazarus
Attorney, Agent, or Firm—Charles R. Rhodes; Judith E. Garmon

[57] ABSTRACT

Water is sprayed onto the surface of a bank of conduits or tubes extending through a heat exchange compartment, which conduits carry the hot exhaust gases from a diesel engine at a temperature of approximately 950°–1100° F. The water is sprayed at such a rate that a substantial portion of the water is reformed into a mixture of hydrogen and oxygen gas and steam. The hydrogen is then mixed with air to form hydrogen enriched air which is introduced into the combustion chamber. When the hydrogen enriched air is compressed, the diesel fuel is introduced with a resulting improvement in fuel efficiency and maximized combustion of the fuel. The water is delivered to the hydrogen generator responsive to the activation of the accelerator pedal at a controlled rate in which the percentage of water to diesel fuel is substantially in the range of 5% to 10%. Air from the engine turbosupercharger is delivered to the hydrogen generator to pick up and carry the hydrogen gas back to the air intake of the engine. Both the diesel fuel and water may be preheated to maximize results.

15 Claims, 4 Drawing Figures

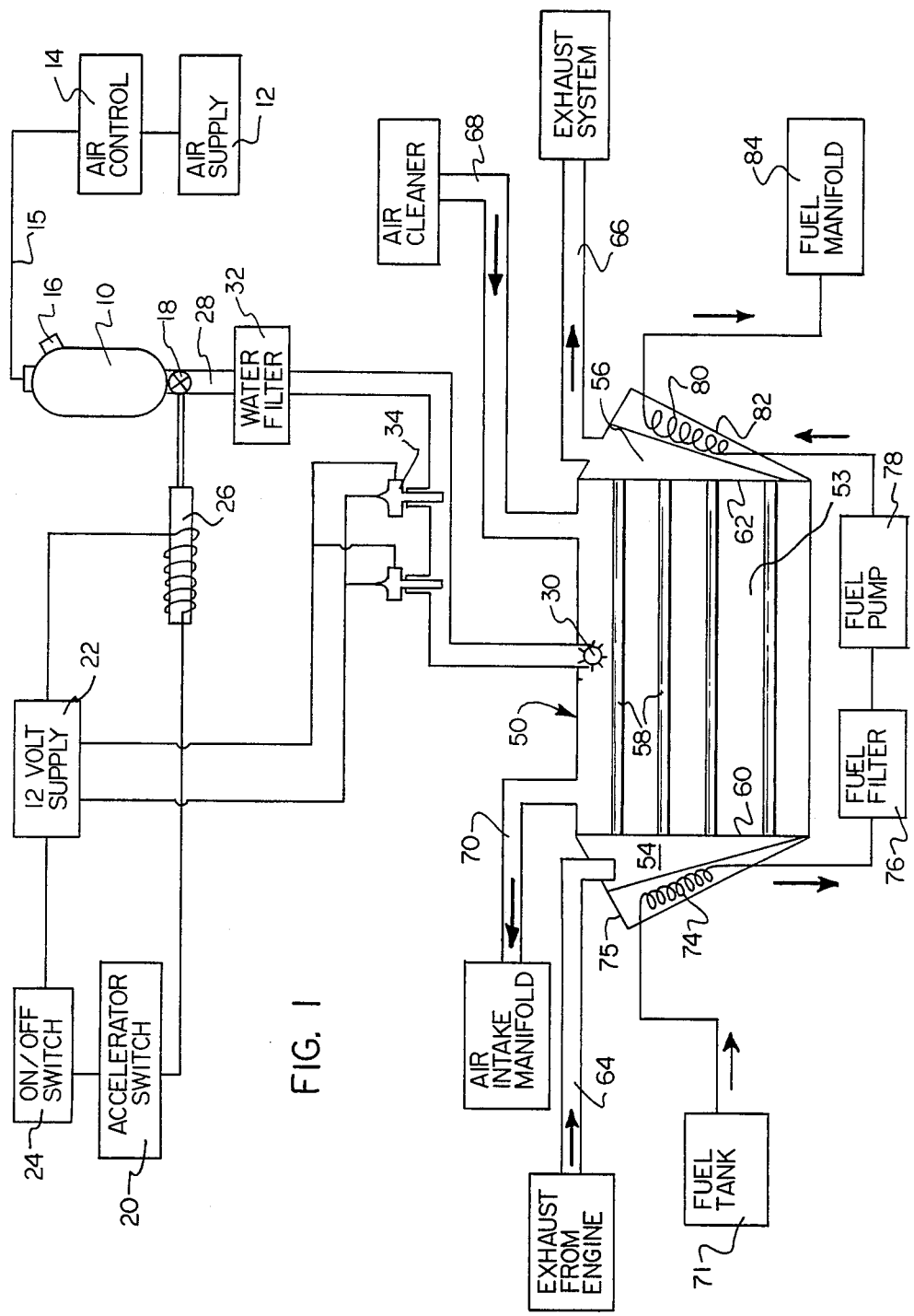

APPARATUS AND METHOD FOR GENERATING HYDROGEN GAS FOR USE AS A FUEL ADDITIVE IN DIESEL ENGINES

REFERENCE TO RELATED APPLICATIONS

The present invention is a continuation-in-part of application Ser. No. 710,718 filed Mar. 12, 1985 in the name of Glenn F. Shelton.

BACKGROUND OF THE PRESENT INVENTION

It has been recognized for many years that the use of hydrogen gas as a primary fuel, supplemental fuel, or fuel additive, either alone in addition to petroleum base fuels offers distinct advantages for the operation of internal combustion engines, particular in light of increased fuel costs, limited supplies, and environmental concerns. The hydrogen gas not only provides fuel efficiencies and economies, but when used with petroleum base fuels also inherently causes them to burn more completely, thus minimizing and at times completely eliminating the contaminating pollutants in the gases exhausted to the atmosphere.

The main effort towards the development of practical usage of hydrogen as a fuel for internal combustion engines has been by way of the storage of hydrogen gas on board the vehicle as the primary fuel source. The most prominent method used for the storage of the gas has been the utilization of various types of metal hydrides, which act as hydrogen gas sponges to absorb and release the gas as required.

Several large business entities such as Brookhaven Labs, Billings Corporation, and Mercedes Benz have adopted such on-board hydrogen storage techniques, however, while such techniques are attractive for many internal combustion engine applications there remains the problem of converting engines to those primarily operated by hydrogen fuel and the problems of distributing hydrogen to the consuming public. For these reasons, it is felt that such an approach is years away from implementation on a commercial scale.

Further, approaches which involve the on-board storage of hydrogen are not initially attractive to a large portion of the users of internal combustion engines, because hydrogen is considered dangerous to store and handle.

Considerable further efforts have been expended toward utilizing hydrogen as a supplemental fuel which may be generated on board in small amounts and used immediately, so that the storage problem does not exist. One such approach deals with heat recovery from the engine exhaust manifolds to drive various types of closed cycle engine loops, which in turn are used to provide a low voltage DC power source required for electrolysis cells which will generate hydrogen from a water source. The major problem with the electrolysis approach is that a very large electrical wattage is required to reform the water into its constituent elements, and the amounts of such energy which can be generated from the exhaust manifold heat has, for the most part, proven insufficient to provide an ample flow of hydrogen. Therefore, these approaches generally require additional sources of electrical energy in order to be operative, and such additional sources of energy (such as additional batteries) are extremely expensive.

Another on-board hydrogen generation technique is the reforming of gasoline in which a small flow volume of gasoline is broken down into its basic components in a thermal reactor, with hydrogen gas produced along with varying amounts of hydrocarbon by-products. While prototypes have been developed, extensive size reduction and improvement will be necessary before commercialization is realized. Further, such approaches are inherently disadvantageous in that a portion of the petroleum fuel, which is attempted to being saved, is utilized in the reforming process and therefore lost as the primary fuel.

Another approach to the on-board generation of hydrogen is the steam-over-iron process, in which water is transformed into steam, and then passed over iron flakes or filings. The iron filings tend to remove the oxygen gas from the steam by an oxidation process, leaving the hydrogen gas for usage as a fuel or fuel supplement. Examples of this approach are described in the patents to Harrel, U.S. Pat. No. 1,966,345 and Kelly, U.S. Pat. No. 4,256,060. It is recognized in both of these patents that periodic cleaning or changing of the iron flakes or filings is necessary in order to keep this technique operative.

In general, prior art disclosures indicate that the engine exhaust heat alone is either insufficient, cannot be kept hot enough, or enough heat therefrom cannot be transferred to the water to liberate hydrogen therefrom. Of all prior art references known to applicant concerning the on-board generation of hydrogen, only two have been located with are directed to the generation of hydrogen from water utilizing primarily a direct heat exchange process. These references are U.S. Pat. Nos. 4,030,453 to Sugimoto, and 4,380,970 to Davis. In the Sugimoto disclosure, the water undergoes a three step heat exchange process, with the final step of the heat exchange taking place in the engine block itself. Thus, a complete redesign of the engine block is necessary and from a commercial standpoint is not likely to receive immediate widespread acceptance. The Davis patent also utilizes a quite complicated technique in which there is provided a disassociation chamber in the form of a transition tube carrying a copper spiral ribbon adjacent the engine manifold through which the water (or steam passes) in order that it be heated sufficiently to disassociate to its constituent gases hydrogen and oxygen. This also is a relatively expensive undertaking involving considerable changes to the engine itself and cannot be easily implemented.

In order to realize early and wide range acceptance, it is believed that a system utilizing hydrogen as a supplemental fuel or fuel additive must be relatively inexpensive; be capable of retrofitting existing engines; be compatible with internal combustion engines without substantial alteration of the engine or engine block; be capable of on-board generation of hydrogen, and the hydrogen must be generated by means of a heat exchange technique.

SUMMARY OF THE PRESENT INVENTION

The present invention relates in general to the improvement of fuel consumption in at least a diesel type internal combustion engine (and is believed to be adaptable for gasoline fuel engines). Particularly the present invention relates to a method and apparatus for generating hydrogen from water for use as a fuel additive by a unique technique in which the water is passed in heat exchange relationship to the hot exhaust gases of the diesel engine at a point remote from the engine.

In accordance with the present invention there is provided a technique (both method and apparatus) for improving the fuel economy and emission quality of a diesel engine wherein water is delivered from a pressurized water source to the water inlet of the heat exchanger (hydrogen generator) at a controlled rate determined by the delivery of diesel fuel to the diesel engine. The hot exhaust gases from the engine manifold are collected and delivered to an exhaust gas inlet of the heat exchanger. The exhaust gases are then separated into a plurality of heat exchange tubes extending through the heat exchanger. The water is sprayed onto the hot conducting walls of the tubes at such a rate as to separate hydrogen gas from water. It is desired that the amount of hydrogen in the hydrogen enriched air mixture should be in the range of 2.8-3.0%. In order to achieve this mix, the ratio of water sprayed relative to diesel fuel delivered to the combustion chamber of the diesel engine is substantially in the range of 5% to 10%. The hydrogen gas (as well as some oxygen gas and steam) which is thus generated is delivered to the air intake of the engine where it is mixed with air and compressed in the combustion chamber prior to the introduction of the diesel fuel for combustion.

In order to provide for a free flow of the generated hydrogen gas (along with oxygen gas and steam) from the heat exchange compartment to the combustion chamber, a flow of air from the exhaust side of the turbosupercharger is introduced into the heat exchanger compartment, where it picks up the hydrogen and delivers it through a second conduit to the air intake manifold leading to the combustion chambers of the diesel engine. In order to control the flow of water to the hydrogen generator (heat exchanger), a solenoid valve, operated responsive to a switch engaged by the accelerator when it is depressed, opens and closes the outlet valve of the water tank depending upon whether the accelerator is delivering diesel fuel to the combustion chamber of the engine or not. In order to improve the efficiency of the hydrogen generator and the overall efficiency of the engine operation, the water may be preheated prior to introduction to the hydrogen generator. Further, the diesel fuel may be preheated by the heat exchanger prior to its introduction into the combustion chamber.

While the prior art approaches indicate that there is insufficient heat from the exhaust manifold to free substantial quantities of hydrogen, the inventor has found that the spraying of water onto a bank of heat exchange tubes, each of which is carrying hot exhaust gases from diesel engines, at least, sufficiently heats the water spray to such a level as to free hydrogen gas therefrom in sufficient quantities to cause the diesel fuel to burn efficiently and cleanly.

It is therefore an object of the present invention to provide an improved method and apparatus for generating and utilizing hydrogen as a fuel additive for diesel internal combustion engines.

It is another object of the present invention to provide a method and apparatus of the type described in which sufficient hydrogen is generated on board to enable a diesel engine to achieve fuel mileage increases in the range of 10%-200% while causing the diesel fuel to burn substantially pollutant free.

It is yet another object of the present invention to provide a method and apparatus of the type described in which the hot exhaust gases from the diesel engine liberate hydrogen from a water supply in such amounts and at such a rate that the hydrogen may be utilized as a fuel additive to substantially increase the rate of fuel consumption and maximize the combustion of the fuel.

Other objects and a fuller understanding will become apparent from reading the following detailed description of a preferred embodiment along with the accompanying drawings in which:

FIG. 1 is a schematic representation of the overall system according to the present invention;

DETAILED DESCRIPTION OF A PREFERRED EMBODIMENT

Figure 3:
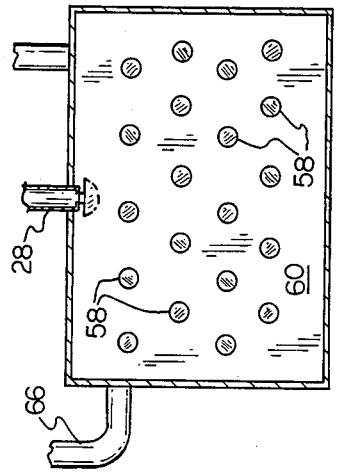
FIG. 3 is a sectional view taken substantially along lines 3—3 in FIG. 2.

Turning now to the drawings, and first of all to FIG. 1, there is illustrated schematically the system according to the present invention, which includes a source or tank 10 of water, a hydrogen generator 50 which receives water from tank 10 and converts it into hydrogen and oxygen gas (along with some steam) as a result of a heat exchange process in which the water is sprayed onto tubes containing hot exhaust gases received from the diesel engine exhaust manifold. The hydrogen is then delivered to the air intake manifold of the diesel engine, where it is introduced into the combustion chamber along with air, compressed, and combusted with the introduction of diesel fuel.

The water tank or source 10 may be of any appropriate size, however, five to ten gallons has been found to be quite adequate, since less than a gallon per hour is utilized. A supply 12 of compressed air from a storage source, or other motorized equipment is employed to supply air under pressure to the water tank 10 through a control valve 14 provided with a pressure gauge. The compressed air from source is introduced into the top of tank 10 through a line 15, and for purposes of this invention, it is desired that the pressure within the water tank be maintained at 80 psi. Tank 10 includes a water fill pipe 16 for replenishing the supply when it is exhausted or is low. An outlet control valve 18 is provided at a bottom opening in the tank for the controlled removal of water therefrom as will be described hereinbelow.

The control of the emission of water from tank 10 is provided by an accelerator limit switch 20, which in turn is connected to the 12-volt voltage supply 22 through the on-off ignition switch 24. Thus, when the accelerator is depressed by the vehicle operator, causing a flow of diesel fuel into the combustion chamber of the diesel engine, switch 20 is activated to transmit a pulse or signal to a solenoid 26 to open valve 18 and cause water to pass into the line 28. Conversely, when the operator lifts his foot from the accelerator, the accelerator switch 20 is deactivated causing solenoid 26 to return the valve 18 to the closed position terminating the flow of water from tank 10.

As long as valve 18 is open, the water is delivered through line 28 to a spray nozzle 30, preferably passing through a water filter 32 to remove the impurities therein which might otherwise tend to clog the system. Desirably, water from tank 10 should be introduced through valve 30 at a temperature of approximately 150° F. This water temperature can be achieved by mounting the water tank under the hood of the vehicle adjacent the diesel engine, so that some heat transfer will be picked up by the water. Additionally, if more heat is necessary to raise the temperature level of the water, glow plugs 34 operated from the 12-volt supply 22 can be inserted in line 28 between outlet control valve 18 and spray valve 30.

Figure 4:
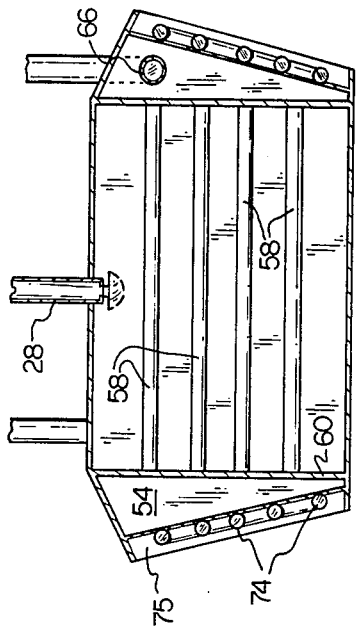
FIG. 4 is a sectional view taken substantially along lines 4—4 in FIG. 2.
Figure 2:
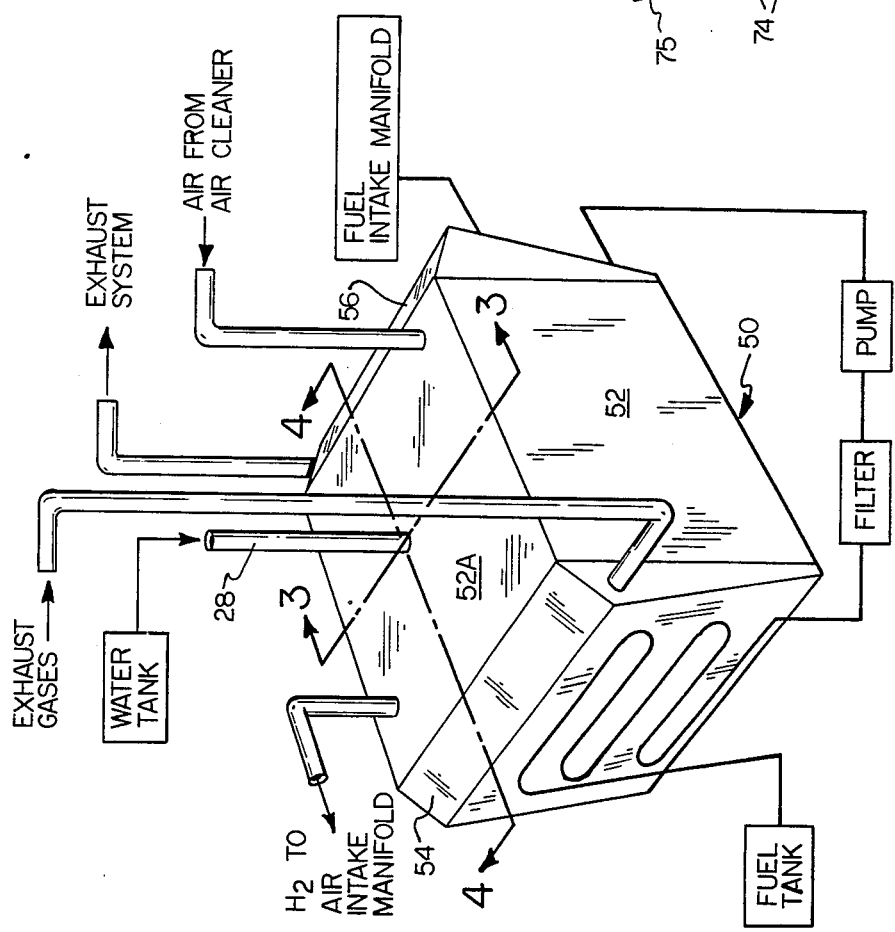
FIG. 2 is a perspective view, with parts broken away, illustrating the hydrogen generator according to the present invention.

Turning now to FIGS. 2-4, there is illustrated the hydrogen generator 50, which is in essence a heat exchanger for transferring heat from the exhaust gases to the water spray. The heat decomposes the water spray to a combination of hydrogen gas, oxygen gas, and steam. The combination is fed to the air intake manifold for mixture with air and introduction into the combustion chamber. The resulting mixture is compressed prior to the introduction of the diesel fuel resulting in a better and more efficient combustion. The generator 50 comprises a housing 52 having a top wall 52a through which the aforementioned water line 28 extends terminating in the spray nozzle 30 thereinside. The interior of the housing 52 forms a heat exchange compartment 53. An exhaust gas receiving compartment 54 on one end of the heat exchanger receives exhaust gases from the diesel engine through an exhaust line 64 (formed of a conventional five inch exhaust pipe). From the exhaust gas receiving compartment 54, the exhaust gases are diverted through the heat exchange compartment through a plurality of heat exchange pipes or tubes 58. The pipes 58 are preferably formed of a thin-walled stainless steel pipe, and the number of such pipes and diameter thereof may vary. For example, one construction which has proven to be satisfactory is an arrangement of twenty (20) one-inch pipes. Whatever the arrangement is, the combined inner diameter of the pipes 58 should be sufficient to receive all of the exhaust gases entering compartment 54 through the five inch exhaust pipe 64 without causing a backup or blockage of the exhaust gases within the receiving compartment 54. A second collecting compartment 56 on the opposite end of heat exchange compartment 53 receives the exhaust gases after they have passed through the heat exchange compartment and delivers them to the exhaust system through an outlet pipe 66. The outlet pipe should be of the same size as the incoming exhaust pipe 64. Walls 60 and 62 separate the heat exchange compartment 53 from the receiving compartment 54 and the collecting compartment 56 respectively.

An air flow path through heat exchange compartment 53 is established by air taken from the outlet side of the turbosupercharger (the air cleaner thereof) through a 2¼ inch flexible pipe 68. The air flow path picks up the hydrogen, oxygen, and steam created by the heat exchange process and delivers this mixture through outlet pipe 70 to the air intake manifold. Outlet pipe 70 is of the same size and type as the inlet pipe 68.

It has also been found that even further increased efficiencies and better combustion can be achieved if the diesel fuel is preheated prior to introduction to the combustion chamber. Therefore, diesel fuel from tank 71 is circulated through a fuel line 72 to a coil 74 in an auxiliary compartment 75 which coil is in heat exchange relation to the exhaust gas receiving compartment 54. The diesel fuel flowing therethrough is thus heated by a heat exchange process. Fuel pump 78 induces this flow of fuel which then passes through fuel filter 76 and onto a second coil 80 extending through a compartment 82 and in heat exchange relation to the surface of the exhaust gas collecting compartment 56. From thence the fuel is transferred to the fuel intake manifold 84 in preparation for introduction to the combustion chambers.

For a better understanding of the present invention, the following discussion describes the transformation of water to a mixture that enhances the combustion characteristics of the diesel fuel. The exhaust gases generated in a diesel engine are usually in the range of 950°-1100° F. When the engine is being worked extremely hard, as in the pulling up a long incline, this temperature can sometimes reach 1200°-1225° F. These gases are then transferred to the generator 50 where it appears that the temperature of the exhaust gases is fairly consistently maintained. Thus, the temperature of the exhaust gases extending through the heat exchange compartment 53 are in the range of 950°-1100° F. To further ensure that the temperature is maintained, of course, the pipe 64 through which the exhaust gases pass as well as the housing 52 can be insulated.

It is further believed that the best mixture of hydrogen gas, oxygen gas, and steam is achieved when the water from tank 10 is preheated to a temperature in the range of 150° F. This can be easily achieved by forming the water tank 10 of a heat conductive material which picks up heat from the engine compartment sufficient to elevate the water therein to the 150° F. level. If such temperature is not achieved, the water can be electrically heated by glow plugs 34.

Experience has shown that the flow of water from tank 10 must be controlled within certain limits relative to the usage of diesel fuel. It has been found that diesel fuel to water ratios in the range of 10:1 to 20:1 provide the best results. For this purpose, a valve 18 which provides a water flow of approximately 0.8 gallons per hour is selected. Depending upon the initial fuel utilization of the diesel engine, then, the diesel fuel to water ratio is maintained.

The spray nozzle 30 is selected to provide a spray spread pattern of approximately 80°. In FIG. 3 it is shown that the twenty (20) one-inch pipes are arranged in four rows of five pipes per row. The pipes in successive rows are staggered, and there is provided about one inch between pipes both vertically and horizontally. The upper row of pipes is positioned about two and one-half to three inches below the spray nozzle 30. Other arrangements are possible, but it is desired to maximize the heated surface area of the pipes 58 to provide as large a surface area as possible upon which the water spray can impinge.

The arrangement illustrated in FIGS. 1-4 has resulted in the reduction of the water spray delivered thereto into a combination of hydrogen gas, oxygen gas, and water vapor or steam. For best results, conditions should be so controlled that the hydrogen generated in such mixture is substantially 2.8%. If the hydrogen generated gets too large (4% or more) premature combustion can occur. It is believed that the water spray should be elevated to a temperature of 800°-900° F. to obtain the most advantageous combustion results. Some hydrogen will begin to be generated at temperatures in the range of 700° F., although the it is believed that the amount generated at such temperature would be too little to be effective.

In an actual road test a diesel tractor-trailer freight carrier having a 290 hp Cummins NTC engine utilized the invention as shown in FIGS. 1-4 for six months. During this time the freight carrier was driven approximately 50,000 miles. Prior to the installation of the hydrogen generator, the truck was averaging to four to four and one-half miles per gallon. Subsequent to the installation and during the test, between seven and seven and one-half miles per gallon were realized. The motor was torn down and checked for any possible damage or defect due to the use of the invention, however, none were found. During the test, no visible pollution from the exhaust stack was noted under any road conditions, even while changing gears, once the engine was warmed up. Thus, the heated air with a higher hydrogen and oxygen content provides better combustion, burns off more of the pollutants before emission, and improves fuel efficiency.

While a preferred embodiment of the present invention has been described in detail hereinabove, it is apparent that various changes and modifications might be made without departing from the scope of the invention set forth in the claims below.

What is claimed is:

1. Method for improving the fuel economy and emission quality of a diesel engine comprising the steps of:
   (a) delivering water from a pressurized water source to the water inlet of a heat exchanger at a controlled rate determined responsive to the delivery of diesel fuel to said diesel engine;
   (b) collecting the hot exhaust gases from said diesel engine and delivering them to the exhaust gas inlet of said heat exchanger;
   (c) separating said exhaust gases into a plurality of tubes or pipes extending through said heat exchanger and having heat conducting walls;
   (d) spraying water through said water inlet onto the surface of the heat conducting walls at such a rate as to reform the atomized water droplets into hydrogen gas, oxygen gas, and water vapor;
   (e) the ratio of water delivered to the heat exchanger relative to diesel fuel delivered to the combustion chamber of said diesel engine being substantially in the range of 1:10 to 1:20;
   (f) delivering said hydrogen gas, oxygen gas, and water vapor to the air intake of said diesel engine where it is mixed with air, introduced into the combustion chamber, and compressed prior to the introduction of said diesel fuel for combustion.

2. The method according to claim 1 wherein the process is controlled to such an extent that the amount of hydrogen gas in said mixture of said hydrogen gas, oxygen gas, and water vapor is in the range of substantially 2.8% to 3.0%.

3. The method according to claim 2 wherein the temperature of said water spray is elevated to the range of 800°–900° F.

4. The method according to claim 1 wherein said diesel fuel is preheated by passing it in heat exchange relation to said heat exchanger prior to delivery to the fuel manifold of said diesel engine.

5. The method according to claim 1 wherein said mixture of hydrogen gas, oxygen gas, and water vapor is delivered from said heat exchanger to the air intake manifold by establishing an air flow path from the outlet side of the engine turbosupercharger to the heat exchanger where the hydrogen, oxygen, and water vapor mixture is picked up and delivered back to the air intake manifold.

6. The method according to claim 1 wherein said water is filtered prior to introduction to said heat exchanger.

7. The method according to claim 1 wherein said water is preheated prior to the introduction to said heat exchanger.

8. Apparatus for generating and delivering a mixture of hydrogen gas, oxygen gas, and steam for mixture with diesel fuel in the combustion chamber of a diesel engine comprising:
   (a) a pressurized source of water;
   (b) a heat exchanger having means associated therewith for receiving water from said water source and exhaust gases from said diesel engine in non-contacting, heat exchange relation to each other;
   (c) means for controlling the flow of water to said heat exchanger responsive to the delivery rate of diesel fuel to the combustion chamber of said diesel engine;
   (d) said heat exchanger comprising:
      (i) an exhaust gas receiving manifold for receiving said exhaust gases from the combustion chambers of said diesel engine and a heat exchange compartment separated therefrom by a wall;
      (ii) a bank of heat exchange tubes formed of a heat conducting material extending through said heat exchange compartment, said tubes being arranged in a bank including a plurality of rows and columns with spaces therebetween;
      (iii) a spray nozzle mounted on the top wall of said heat exchange compartment above said bank of heat exchange tubes and connected to said pressurized source of water;
   (e) means connecting the interior of said heat exchange compartment with said combustion chamber for circulating air through said heat exchange compartment and on to said combustion chamber whereby hydrogen gas, oxygen gas, and steam are delivered thereto.

9. The apparatus according to claim 8 wherein the means for controlling the flow of water to said heat exchanger comprises a control valve in the bottom of said water tank mechanically connected to and operated by a solenoid, a limit switch associated with the accelerator of said diesel engine and activated thereby to transmit an electrical signal to said solenoid for the operation of said control valve.

10. The apparatus according to claim 8 and further including a fuel line extending between the diesel fuel tank for said diesel engine and the fuel intake manifold thereof and a means for transferring heat from said heat exchanger to said fuel line.

11. The apparatus according to claim 8 wherein said control valve is of such size and so constructed as to deliver substantially 0.8 gallons per hour and said spray valve is so constructed as to generate a spray having an angle of divergence of 80°.

12. The apparatus according to claim 8 wherein said diesel engine includes an air intake manifold and said heat exchange compartment is connected to said air intake manifold of said diesel engine by a flexible conduit through which said mixture of hydrogen gas, oxygen gas, and steam are delivered thereto; said diesel engine further including a turbosupercharger and said heat exchange compartment being further connected to the outlet side of said turbosupercharger for receiving a flow of air thereinto, which air picks up said mixture of hydrogen gas, oxygen gas, and steam and delivers it to said air intake manifold.

13. The apparatus according to claim 8 and further including an exhaust conduit connecting the exhaust manifold of said diesel engine to an exhaust gas receiving compartment of said heat exchanger.

14. The apparatus according to claim 8 and further including means for preheating said water prior to delivery of said heat exchange compartment.

15. The apparatus according to claim 8 and further comprising means for filtering said water from said water source prior to delivery to said heat exchange compartment.

* * * * *